G. S. SMITH.
DRAFTSMAN'S APPARATUS.
APPLICATION FILED JULY 21, 1908.
1,035,755.
Patented Aug. 13, 1912.
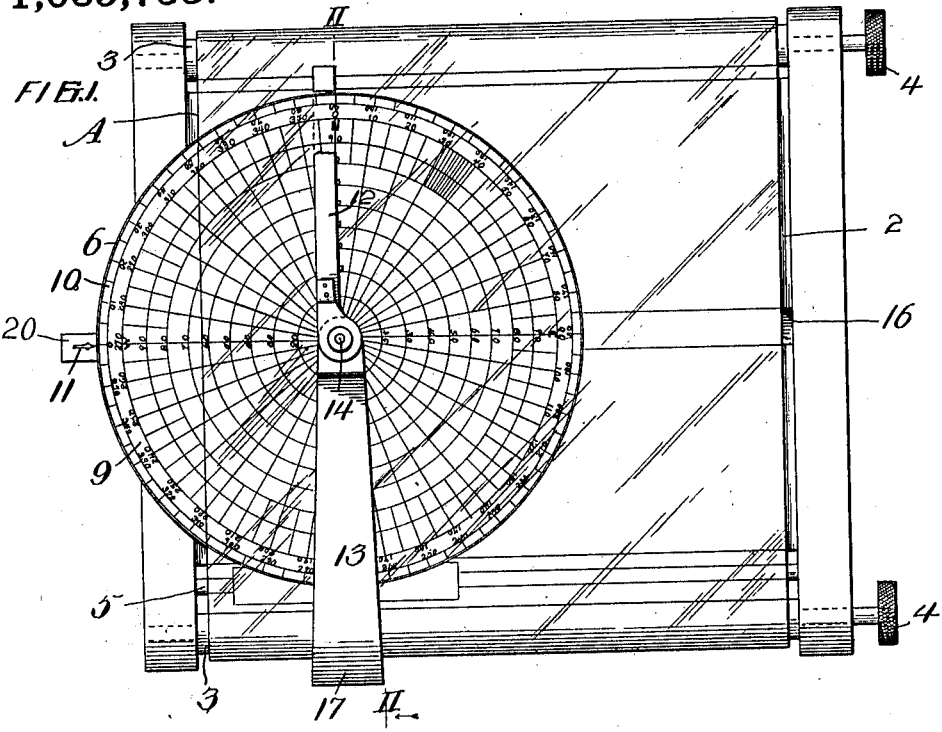
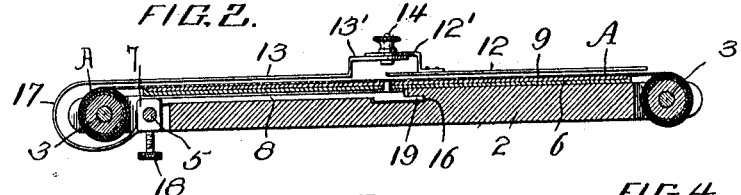
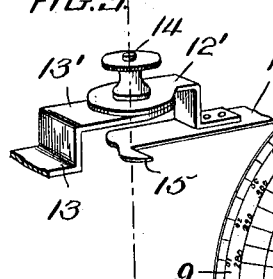
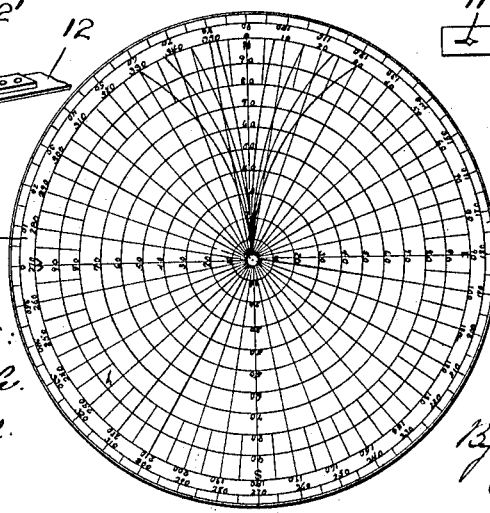
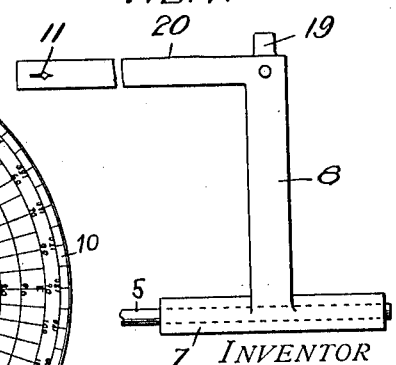
WITNESSES:
W. F. Doyle
L. C. Brady
INVENTOR
Glenn S. Smith
By John S. Barker
his Attorney
COLUMBIA PLANOGRAPH CO., WASHINGTON, D. C.

UNITED STATES PATENT OFFICE.

GLENN S. SMITH, OF WASHINGTON, DISTRICT OF COLUMBIA.

DRAFTSMAN'S APPARATUS.

1,035,755.  Specification of Letters Patent. Patented Aug. 13, 1912.

Application filed July 21, 1908. Serial No. 444,664.

*To all whom it may concern:*

Be it known that I, GLENN S. SMITH, a citizen of the United States, residing at Washington, District of Columbia, have invented new and useful Improvements in Draftsmen's Apparatus, of which the following is a specification.

This invention relates to apparatus adapted for use in map drawing, particularly in the making of maps from field notes, such as are taken by surveyors.

While it may be used in the making of maps of any kind it has been found to be particularly adapted for platting railways, roads, canals, rivers, and the like, where the length of the finished map is great compared with its width.

It has for its object to make it possible, as well as simple and easy, to lay out or plat upon the sheet the finished map directly from the surveyor's notes, and to accomplish this without the use of numerous instruments or complicated apparatus.

In the accompanying drawings: Figure 1 is a plan view of an apparatus embodying my invention. Fig. 2 is a sectional view taken on the line II—II, of Fig. 1. Fig. 3 is a detail perspective view illustrating the connection between the ruler or straight edge and the arm by which it is carried. Fig. 4 is a detached plan view of the carrier frame for the protractor. Fig. 5 is a plan view of a form of protractor particularly adapted for use in railway map drawing.

In the accompanying drawings 2 indicates a board or frame of suitable size having a plane upper surface, and, if found desirable, provided with supports or attachments by which it may be either carried by a stand or supported on a table. At its ends are mounted rollers 3 upon which is supported a strip or sheet of paper or fabric of transparent or semi-transparent material adapted to have the map made directly thereon, the rollers being supported in suitable bearings so located that the sheet in passing from one roller to the other lies close to the upper surface of the board 2. The shafts of the rollers are provided with milled heads 4 or other means for turning them so that the sheet may be wound from one roller to the other.

5 indicates a rod suitably supported and preferably arranged close to and parallel with one of the rollers 3. Upon it is mounted a carrier for a circular protractor 9. The carrier comprises a sleeve 7 that encircles the rod 5 and is free to slide thereon transversely of the board, an arm 8 and a thin plate 6 carried by the arm and arranged to lie flat upon the upper face of the board 2. The plate has formed in its upper surface a shallow seat for the protractor 9, or is otherwise constructed to support it. The size of the protractor is preferably as large as may be conveniently employed between the rollers 3, and when in use it is arranged between the upper surface of the board and the sheet A, and is freely movable transversely under the latter.

In order to prevent the protractor and its carrier from accidentally turning about the rod 5 and moving away from the face of the board, with the result that the sheet might be torn, I may provide the board with a transverse under-cut slot 16, in which is adapted to travel a projecting lip 19 carried by the arm 8 of the carrier.

The protractor is peculiar in several respects being formed with a series of concentric circles constituting a linear measuring scale, and lines radiating from the said center, constituting the protractor proper. The circles are preferably numbered from the center outward, and are equally spaced apart according to the scale of the protractor so that by their use the distance of any point from another point, no matter what its direction therefrom may be, can be easily determined by bringing the center of the protractor over the starting point and then counting the number of circles between the two points, whose distance apart it is desired to ascertain, along that radiating line which connects them. The radiating lines are marked to indicate degrees, the figures being preferably arranged in a circle near the periphery of the protractor. The base line marked "0" is usually also designated N, and in using the apparatus is taken as the north line, whatever may be the positions to which the protractor may be adjusted. Around the peripheral edge of the protractor is a scale, 10, divided into degrees and properly marked, the numbering being preferably in the same direction as the numbering of the radiating lines, but with the zero mark arranged opposite the end of the 270° radiating line, that is to say, opposite the west line, though this particular arrangement is merely chosen for convenience. The protractor and the plate 6 on which it is supported, are rotatable about a center, which is the center from which the lines of the protractor radiate and about which the concentric circles are arranged. An arm, 20, of the laterally adjustable carrier frame extends beyond the edge of the protractor and is provided with an index, 11 which may be either a mark upon the arm 20 or a raised projection in the form of a pointer or index carried thereby. This arm preferably extends toward the left and the index mark, 11, thereon normally lies opposite the zero mark of the scale 10, in which position the north and south lines of the protractor are parallel with the direction of movement of the sheet as it is wound from one roller to the other.

The protractor and its carrier, as stated, lie flat upon the surface of the board 2, with the sheet A passing over them, and, this being transparent, the lines of the protractor are easily seen through the sheet and may therefore be used to assist the draftsman in drawing the map which he may be producing. If sufficient care and skill be exercised maps or other plats or plans may be drawn with the assistance of this apparatus without the use of a ruler, straight edge, or curve, by following the proper lines of the protractor as they appear through the sheet. It greatly facilitates the use of the apparatus however, to provide a straight edge or ruler that may be used in drawing all straight lines. Such ruler or straight edge is indicated at 12 and is hinged or pivoted to a carrying arm 13. This in turn is connected with the sleeve 7, so as to be movable back and forth across the board with the protractor, always maintaining a fixed relation thereto. That portion of the carrying arm situated between the part that lies parallel to the face of the board 2 and the sleeve 7 is curved, as indicated at 17, to pass freely around the roller 3.

18 indicates a set-screw mounted in the sleeve 7 by means of which the protractor may be secured in the position to which it may be adjusted.

The pivot 14 uniting the straight edge or ruler with its carrying arm is located directly over the center of the protractor and in line with its axis of rotation. The working edge of the ruler is so disposed that a line drawn by an instrument guided thereby will always radiate from the center of the protractor, no matter into what position it may be adjusted; and the inner end of its edge should preferably terminate at such center. If desired, the ruler may be formed at its inner end with a projection or off-set, 15, adapted to form, in connection with the working edge, an angular seat for the point of a drawing instrument, located at the starting point for each line to be drawn, that is, directly over the center of the protractor. The pivot 14 is mounted in brackets, 12′, 13′ carried respectively by the ruler or straight edge 12 and the arm 13 and constructed to stand sufficiently above the surface of the sheet A to allow the drawing instrument to follow the edge of the ruler quite to its inner or pivotal end.

For railway map drawing and some other kinds of work the protractor may be provided with a series of curves, in addition to the radiating lines and concentric circles, as indicated in Fig. 5. These curves spring from the center of the protractor, bending to the right and to the left respectively, and are of different degrees of curvature, as curves of one degree, two degrees, three degrees, etc.

The method of using the instrument may now be described.

Let it be supposed that it is desired to plat the field notes of the surveyors who have laid out a railway line. A strip of transparent paper or linen of a length for the map, representing, let us say, fifty miles of railway, is placed upon the rollers 3. The general direction of the line is then ascertained, which, it will be supposed, is 43° east of north. The protractor is then rotated so that the radiating line indicating forty three degrees east of north stands lengthwise of the strip, that is to say, it is turned until the 43° mark of the scale 10 comes opposite the index line, 11. Then beginning near one end of the sheet a point is designated for the starting point of the line, and this is brought directly over the center of the protractor, which is easily accomplished by adjusting the sheet A and the protractor. The parts may be fixed in this position by the use of the set-screw 18, although this will not always be necessary. The surveyor's notes are then read indicating the direction of the line from the starting point, which, it will be assumed, is 20 degrees east of north. The straight edge is then moved over the radiating line indicating this direction, such line being marked 20, and a line is drawn on the sheet in that direction, and of a length called for by the notes and determined by the scale formed by the concentric circles, and a point is indicated at the end of this line. This point is then brought over the center of the protractor, separate adjustments of the sheet and protractor being required for this purpose. From this point the road bends to the right with a five degree curve. As the curves are all related to a single line as a tangent, the north and south line of the protractor being chosen for this purpose, it follows that the straight line last drawn upon the sheet A must be brought to lie parallel with the said north and south line, or, in other words, the protractor must be adjusted about its center so as to bring these two lines into superposed relations, which, under the conditions just supposed, is secured by turning the protractor until the mark 20 of the scale 10 comes opposite the index 11. A line is then drawn on the sheet, following the five degree curve there indicated, for the proper distance, which may be determined by the use of the scale formed of the concentric circles, and a point located where the curve terminates. This point is then brought opposite to the center of the protractor by proper adjustments of the latter and the sheet. The protractor is then rotated back to its former position, that of 43° on the scale 10, and a line is drawn corresponding with the surveyor's notes, which, it will be supposed, read north 62° east one mile, and a point located thereon indicating the termination of the line in this direction. And thus the making of the map proceeds, the sheet and the protractor being shifted each time there is a change in the direction of the line, and the point last located brought opposite to the center of the protractor.

In making maps where curves are not considered or represented, but only the angles between points, the position of the protractor does not have to be changed after having been first adjusted with reference to the longest dimension of the map.

In using an apparatus or device such as described, the work of the draftsman is reduced to a minimum. Calculations and adjustments are almost entirely eliminated, it being only necessary that the ruler or straight edge, which may be entirely free and disconnected from the board if desired, be laid over the line of the protractor corresponding with the direction given in the notes from which the plat or map is being made and the line drawn. Special care as to the length of the line need not at first be taken, as the point indicating its termination can be located by the use of the linear measurement scale formed by the concentric circles after the line is drawn. It matters not to what position the protractor may be set with reference to the board and the sheet A, its use is always the same—the draftsman follows the lines of the protractor corresponding with the reading of the notes from which he is working.

What I claim is:

1. The combination of a board, supports for the sheet on which a map is to be drawn arranged to guide the sheet across the surface of the board, a movable protractor arranged to lie between the board and the sheet, and means for directing the movements of the protractor and maintaining it in fixed angular relations to the sheet, substantially as set forth.

2. The combination of a board, supports for the sheet on which a map is to be drawn arranged to direct the sheet across the face of the board, a movable protractor arranged to lie between the board and the sheet, and means for directing the protractor whereby its movements are caused to be transverse relatively to the sheet, the protractor being rotatable about its own center.

3. The combination of a board, rollers supported thereby adapted to receive and guide a sheet on which may be drawn a map, a carrier or frame movable transversely of the sheet and arranged between it and the board, a protractor mounted on the carrier and rotatable, and an index movable with the carrier and with reference to which the protractor is rotatable.

4. The combination of a board, supports for a sheet on which a map may be drawn arranged to cause the sheet to lie over the face of the board, a movable protractor arranged between the board and the sheet, means for directing the movements of the protractor, and a ruler arranged above the sheet and having its working edge arranged over the center of the protractor.

5. The combination of a board, rollers supported near its opposite edges arranged to receive a sheet on which the drawing may be made, a guide rod parallel with the rollers, a carrier or support mounted on the guide rod, and a protractor mounted on the carrier and arranged to lie between the board and the drawing, the protractor being rotatable, substantially as set forth.

6. An apparatus adapted to be used in drawing maps, comprising a base board, a movable protractor arranged to lie between the base board and the sheet on which the drawing is to be made, and a ruler movable with the protractor arranged to lie above the sheet on the side thereof opposite the protractor, substantially as set forth.

7. An apparatus adapted to be used in making maps, comprising a base board, a protractor arranged to lie between the base board and the drawing sheet, and a ruler arranged to lie on the side of the sheet opposite the protractor, the ruler being movable with the protractor, and being also angularly adjustable, its center of angular adjustments being located over the center of the protractor, substantially as set forth.

8. An apparatus adapted to be used in drawing maps, comprising a base board, supports for holding a sheet of paper on the board, a protractor arranged to lie between the board and the drawing sheet, a movable carrier for the protractor, an arm connected with the carrier and exetending above the sheet, a ruler pivotally connected with the said arm arranged to lie above the sheet, the connecting parts of the arm and the ruler being elevated relative to the ruler and the pivot being arranged above the center of the protractor.

9. In an apparatus adapted to be used in map drawing, the combination of a base board, supports for the sheet on which the map is to be drawn, a protractor arranged to lie between the board and the sheet, means for directing the movements of the protractor transversely of the sheet, and means for preventing the protractor from being accidentally moved away from the face of the board.

GLENN S. SMITH.

Witnesses:
J. S. BARKER,
GEO. B. PITTS.

Copies of this patent may be obtained for five cents each, by addressing the "Commissioner of Patents, Washington, D. C."